US012025955B2

(12) United States Patent
Tortora et al.

(10) Patent No.: US 12,025,955 B2
(45) Date of Patent: Jul. 2, 2024

(54) INTERMITTENT DISPLAY MECHANISM FOR TIMEPIECE

(71) Applicant: The Swatch Group Research and Development Ltd, Marin (CH)

(72) Inventors: Pierpasquale Tortora, Neuchâtel (CH); Cédric Blatter, Commugny (CH)

(73) Assignee: The Swatch Group Research and Development Ltd, Marin (CH)

( * ) Notice: Subject to any disclaimer, the term of this patent is extended or adjusted under 35 U.S.C. 154(b) by 441 days.

(21) Appl. No.: 17/377,889

(22) Filed: Jul. 16, 2021

(65) Prior Publication Data

US 2022/0113680 A1 Apr. 14, 2022

(30) Foreign Application Priority Data

Oct. 14, 2020 (EP) .................................... 20201794

(51) Int. Cl.
*G04B 45/00* (2006.01)
*G04B 19/02* (2006.01)
*G04B 19/30* (2006.01)

(52) U.S. Cl.
CPC ............ *G04B 19/30* (2013.01); *G04B 19/02* (2013.01); *G04B 45/0007* (2013.01)

(58) Field of Classification Search
CPC .... G04B 19/30; G04B 19/02; G04B 45/0007; G04B 47/00; G02B 26/0825;
(Continued)

(56) References Cited

U.S. PATENT DOCUMENTS 8,787,120 B2 * 7/2014 Fleury .................... G04B 19/30 368/232
9,876,445 B2 * 1/2018 Jeong ...................... H02N 2/18
(Continued)

FOREIGN PATENT DOCUMENTS

CH 710 521 A2 6/2016
CN 1082795 A 2/1994
(Continued)

OTHER PUBLICATIONS

European Search Report issued Mar. 26, 2021 in European Application 20201794.3, filed on Oct. 14, 2020 (with English Translation of Categories of cited documents), 3 pages.
(Continued)

*Primary Examiner* — Sean Kayes
(74) *Attorney, Agent, or Firm* — Oblon, McClelland, Maier & Neustadt, L.L.P.

(57) ABSTRACT

An intermittent display mechanism for a timepiece includes a mobile component in motion, an energy source for supplying a light emission source coupled with a light guide, and light emission control means. The light emission control means includes a flexible body bearing a flexible piezoelectric film or coating coated in an electrically insulating shell and attached to a fixed structure and including a distal zone overhanging with respect to the structure, arranged to interfere mechanically, at periodic or random times, with the mobile component during the travel thereof and move away from the rest position thereof before starting vibration of the flexible body and the piezoelectric film or coating, which constitutes an energy source, to convert the mechanical energy supplied by the mobile component into electrical energy supplied to the light emission source.

13 Claims, 3 Drawing Sheets

(58) Field of Classification Search
CPC .... G02B 6/2557; H02N 2/186; G04G 9/0017; H10N 30/30; H10N 30/886
See application file for complete search history.

(56) References Cited

U.S. PATENT DOCUMENTS

| | | | | |
|---|---|---|---|---|
| 10,254,715 | B2 * | 4/2019 | Peters | H05B 45/42 |
| 11,476,780 | B2 * | 10/2022 | Yang | H02J 7/32 |
| 2002/0126086 | A1 | 9/2002 | Takeuchi et al. | |
| 2008/0004510 | A1 * | 1/2008 | Tanzawa | A44C 5/0015 600/301 |
| 2018/0299830 | A1 * | 10/2018 | Peters | F21V 33/0004 |
| 2021/0305914 | A1 * | 9/2021 | Yang | A44C 5/0007 |
| 2021/0367134 | A1 * | 11/2021 | Friis | H10N 30/30 |

FOREIGN PATENT DOCUMENTS

| | | | |
|---|---|---|---|
| CN | 1087414 | A | 6/1994 |
| CN | 1603985 | A | 4/2005 |
| CN | 102385310 | A | 3/2012 |
| CN | 206421170 | U | 8/2017 |
| EP | 2 343 747 | A1 | 7/2011 |
| WO | WO 2012/164545 | A1 | 12/2012 |

OTHER PUBLICATIONS

Chinese Office Action issued Mar. 14, 2024, in Chinese Patent Application No. 202111175241.6, citing documents 1 and 15-19, therein, 6 pages.

* cited by examiner

INTERMITTENT DISPLAY MECHANISM FOR TIMEPIECE

FIELD OF THE INVENTION

The invention relates to an intermittent display mechanism for a timepiece including at least one mobile component in motion during the operation of said timepiece, said mechanism including energy supply means for supplying at least one light emission source included in said mechanism and which is coupled with at least one light guide, and light emission control means.

The invention further relates to a timepiece, particularly a watch, including at least one mobile component in motion during the operation of this timepiece, and at least one such intermittent display mechanism.

The invention relates to the field of horological display mechanisms.

BACKGROUND OF THE INVENTION

Skygazing has inspired many watch models over time. The moon phase, for example, is a very popular mechanism in mechanical watches. Further models have made reference to constellations, planets, signs of the zodiac, etc. Therefore, references to astronomy are broken down into several forms in watchmaking, both as a merely decorative and functional aspect.

No device has yet been devised to display a fleeting phenomenon such as a shooting star in a watch.

SUMMARY OF THE INVENTION

The invention proposes to create, in a watch, a particular visual effect, particularly that of a luminous shooting star, or northern lights, with the use of an autonomous device driven by the watch mechanics, and not requiring the supply of energy from a battery or similar. This visual effect of a shooting star or northern lights is advantageously obtained with a piezoelectric device.

For this purpose, the invention relates to an intermittent display mechanism for a timepiece according to claim 1.

The invention further relates to a timepiece, particularly a watch, including at least one mobile component moving during the operation of this timepiece, and at least one such intermittent display mechanism.

BRIEF DESCRIPTION OF THE DRAWINGS

Further features and advantages of the present invention will emerge on reading the following detailed description, with reference to the appended figures, wherein.

DETAILED DESCRIPTION OF PREFERRED EMBODIMENTS

Figure 1:
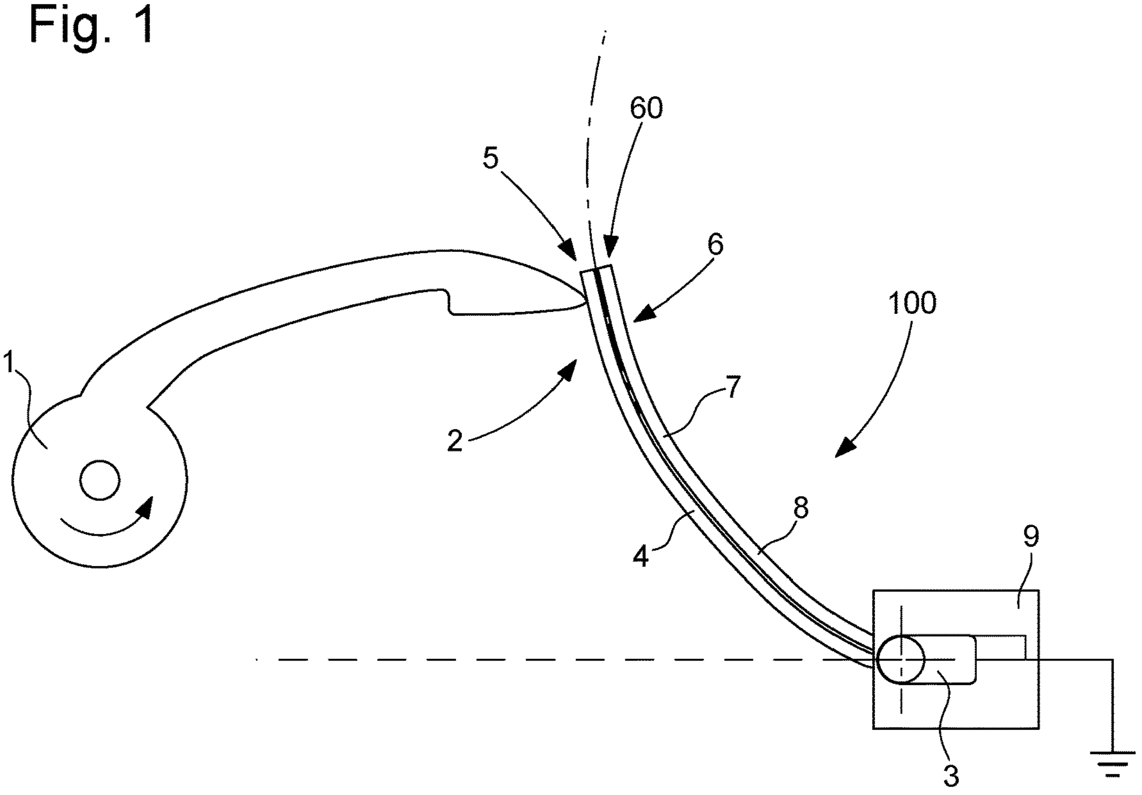
FIG. 1 represents, schematically, an intermittent display mechanism for a timepiece according to the invention, in a particular and non-limiting embodiment of the invention, with a mobile component, here a cam, which deforms a flexible body, which includes a light guide and a flexible piezoelectric coating; the optical fibre is aligned in front of a light emission source formed by an LED, in order to enable an optical coupling, this LED being electrically connected to the flexible piezoelectric film; the flexible body is in a contact position with the end of the cam, just before the disconnection thereof; the flexible body extends along a curvilinear direction represented with a dot and dash line, and moves away from the linear idle position thereof represented with a dashed line.

The shooting star phenomenon is generated by the fall, through the atmosphere, of fragments of material, circulating in space, which are attracted by terrestrial gravitation. Due to the high speed and friction against the molecules in the atmosphere, the material burns and disintegrates while it falls, producing a trail of light in the sky. These phenomena occur continually around the planet, and become clearly visible especially at night. At certain times of the year, the Earth passes through regions of space where there are higher concentrations of debris, increasing the frequency of the phenomenon.

However, the appearance of a shooting star remains an unpredictable, random and inherently short-lived event. Therefore, the phenomenon is fascinating and quite rare to observe, so much so that popular tradition invites us to make a wish whenever we happen to observe one. This romantic aspect of observing a shooting star fits in very well with the watchmaking tradition, which is an incentive to create such an effect in a watch.

To this end, the invention relates to a device which makes it possible to generate, periodically, or at random, an instantaneous and fleeting luminous effect.

The invention relates more particularly to a portable apparatus, including at least one piezoelectric component coupled with an optical fibre, for triggering a visual effect such as a flash following an action of a user on a push-piece, or on receiving a signal such as a telephone call, or following a programmed or random shock between the piezoelectric component and another mobile component of this portable apparatus.

More particularly, the invention thus relates to an intermittent display mechanism 100 for a timepiece 1000 including at least one mobile component 1 in motion during the operation of the timepiece 1000, This mobile component 1 can be any mobile component of the movement: hand, lever, tourbillon frame, jumper, or other, the shock optionally being periodic or aperiodic.

This mechanism 100 includes energy supply means 2, for supplying power to at least one light emission source 3, included in the mechanism 100, and which is coupled with at least one light guide 4, and includes light emission control means 5.

According to the invention, these energy supply means 2 include, or consist of:

either a microgenerator, which is activated by a mobile control organ or by a barrel of the timepiece, and is arranged to simultaneously activate a movement of a flexible body 6 via an impulse or percussion means, or a flexible piezoelectric film or coating 7, borne by a flexible body 6 and which is coated in an electrically insulating shell 8, and which is arranged to convert mechanical energy, supplied by the mobile component 1, into electrical energy and to supply it to at least one light emission source 3.

In the alternative illustrated by the figures, these light emission control means 5 include at least one such flexible body 6, which bears a flexible piezoelectric film or coating 7 coated in an electrically insulating shell 8.

This flexible body 6 is attached to a fixed structure 9 included in the mechanism 100, and includes at least one distal zone 60, which is overhanging with respect to the structure 9.

This distal zone 60 is arranged to interfere mechanically, at periodic or random times, with at least one such mobile component 1 during the movement thereof, during the travel of the mobile component 1, and to thus move away from the rest position thereof, before starting the vibration of the flexible body 6 and the piezoelectric film or coating 7, which forms energy supply means 2, so as to convert the mechanical energy supplied by the mobile component 1 into electrical energy and to supply it to at least one light emission source 3.

More particularly, the flexible body 6 bears at least one light guide 4 or consists of at least one light guide 4. Even more particularly, at least one light guide 4 is an optical fibre. Even more particularly, the optical fibre is coated with a flexible piezoelectric coating 7, which is coated in an electrically insulating shell 8.

In an alternative embodiment, the optical fibre is arranged to transmit point-shaped light at the distal end thereof. It is thus possible to obtain the effect of a light spot, the rapid movement whereof is similar to a shooting star.

In an alternative embodiment, the optical fibre is arranged to diffuse light along all or part of the length thereof.

In an alternative embodiment, the optical fibre is covered with fluorescent material so as to emit light of different colours, coupled with at least one said ultraviolet light emission source 3.

More particularly, at least one light emission source 3 is an LED.

Thus, by extracting light along the entire length of the optical fibre, it is possible to obtain a northern lights effect by combining movement and this particular light diffusion.

More particularly, the mechanism 100 includes a semi-transparent or translucent screen, to conceal the flexible body 6 from the user, while allowing the passage of the light emitted by a light emission source 3 and transported by at least one light guide 4.

More particularly, the mechanism 100 includes a control means 11, which is accessible to the user, or which is controlled by the timepiece 1000, to set in motion at least one striker 12 from a rest position to strike at least one flexible body 6, and the mechanism 100 includes elastic return means 13 to control the return of the striker 12 from the percussion position to the rest position thereof. This striker 12 is particularly, and non-restrictively, a dedicated organ, intended to be moved by the user, by means of a push-piece or other, for example for demonstration purposes.

A triggered shock is capable of generating such a piezoelectric effect, and the invention is adaptable to further alternative embodiments.

The invention further relates to a timepiece 100, particularly a watch, including at least one mobile component 1 in motion during the operation of this timepiece 1000, and at least one such intermittent display mechanism 100.

More particularly, this timepiece 1000 includes at least one main striker 15, which can move from a rest position to strike at least one flexible body 6, and main elastic return means 16 to control the return of the main striker 15 from the percussion position to the rest position thereof.

More particularly, the timepiece 1000 includes a main control means 14, which is accessible to the user, or which is controlled by the timepiece 1000, to set in motion at least one main striker 15.

More particularly, the timepiece 1000 includes a horological movement 500 or a striking or alarm mechanism 600, to control a movement of at least one main striker 15.

FIG. 1 schematically illustrates the main elements of such a device. An optical fibre 4 and a flexible piezoelectric film 7 are assembled together so as to form a flexible body 6, which is an integral but flexible body. The latter is attached to one end to form an overhanging lever. The piezoelectric film is coated in an electrically insulating material. At the position of the point of the attachment thereof, the optical fibre 4 is aligned in front of a light emission source 3, particularly an LED, in order to enable an optical coupling. This LED 3 is electrically connected to the flexible piezoelectric film 7.

In the absence of mechanical action, the flexible body 6 remains in the rest position thereof, represented with a dashed line in FIG. 1. In the rotation thereof driven by the movement of the watch 1000, the end of a mobile component 1, here a cam, progressively deforms the flexible body 6. This deformation produces an accumulation of charges on the surfaces of the flexible piezoelectric film 7 by piezoelectric effect.

Figure 2:
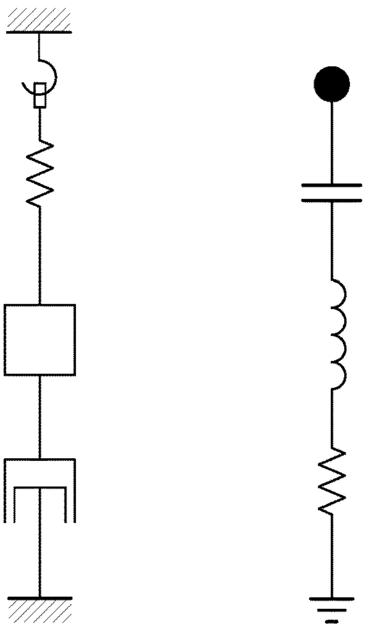
FIG. 2 represents, schematically, the well-known analogy between the elements of a mechanical oscillator in the left section: spring, inertial mass, and shock-absorber, and those of an electric oscillator: condenser, coil, resistance, as formed by this flexible piezoelectric body in the right section of the figure.

The deformation continues until the mobile component 1, particularly the cam, loses the contact with the flexible body 6. The flexible body 6 is then released and starts oscillating about the rest position thereof. The number of oscillations and the frequency are linked with the mechanical characteristics of the materials used. The mechanical energy supplied by the mobile component 1 is partially converted into electrical energy in the flexible piezoelectric film 7 by piezoelectric effect. FIG. 2 shows the well-known analogy between the elements of a mechanical oscillator: spring, inertial mass, and shock-absorber, and those of an electric oscillator: condenser, coil, resistance, as formed by this flexible piezoelectric body 6. The mechanical deformation creates on the surfaces of the flexible piezoelectric film 7 a difference in potential dV, which is proportional to the deformation imposed thereon. The difference in potential dV changes sign when the flexible body 6 moves from one side to the other of the rest position thereof.

Figure 3:
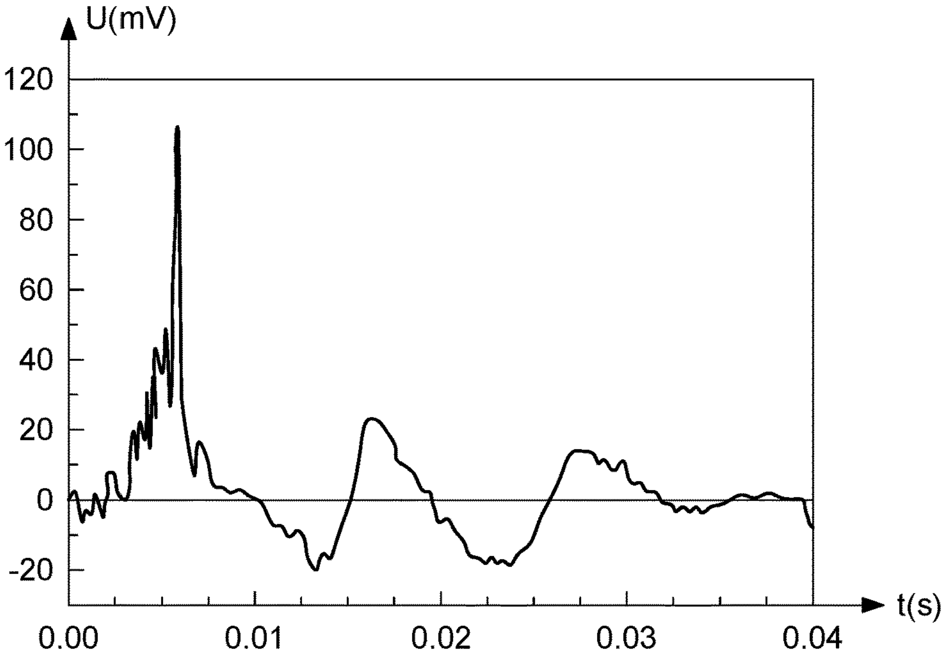
FIG. 3 is a graph showing the progression of the voltage as a function of time, during the oscillation of the flexible body after the mechanical deformation imposed by the cam and the release thereof.
Figure 4:
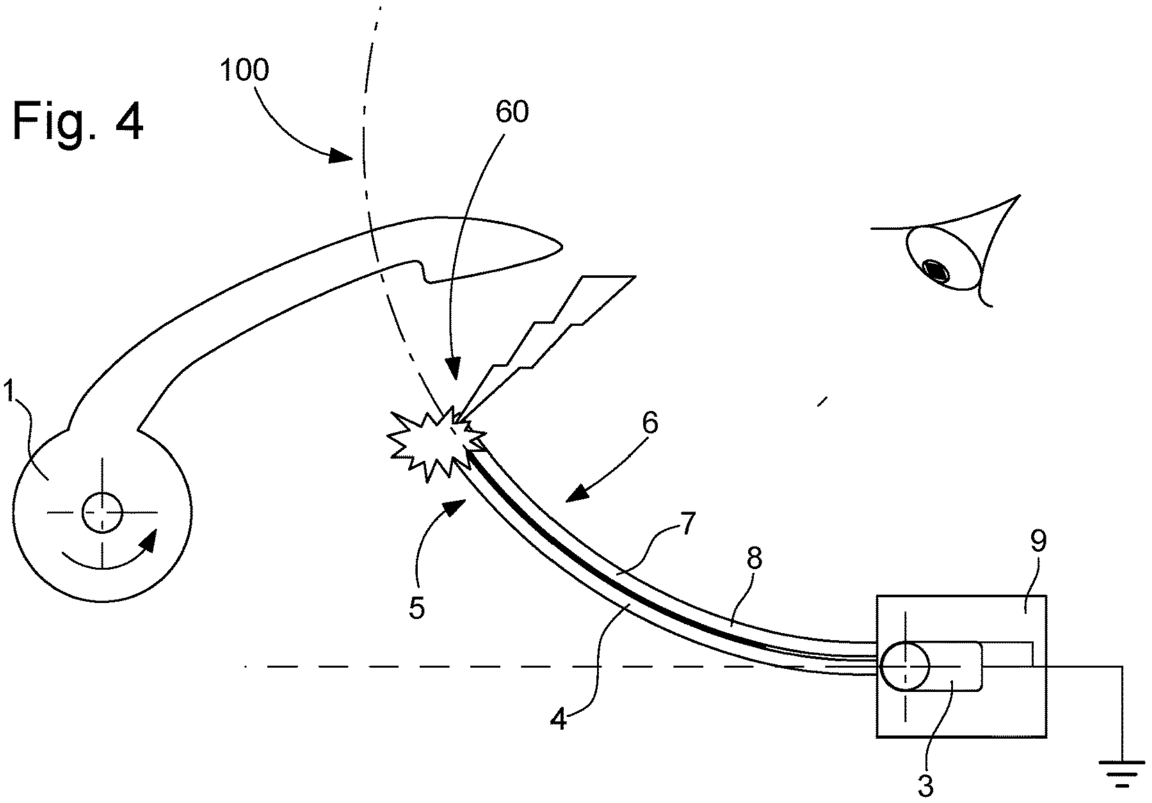
FIG. 4 represents, similarly to FIG. 1, the same mechanism just after the release of the flexible body by the cam; the LED is polarised directly and can emit light, which is coupled inside the optical fibre, and comes out of the free end thereof, wherein the rapid oscillation, combined with the simultaneous light emission and the viewer's retinal persistence, makes it possible to create the effect of a shooting star.
Figure 5:
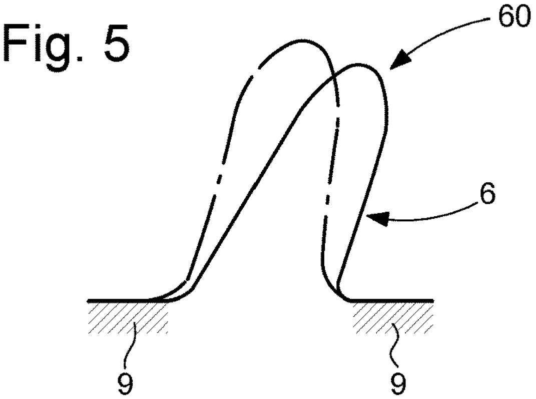
FIG. 5 represents, partially, an alternative embodiment where the flexible body is attached at two ends to the structure, and includes a median zone arranged to interfere with the energy supplying mobile component.
Figure 6:
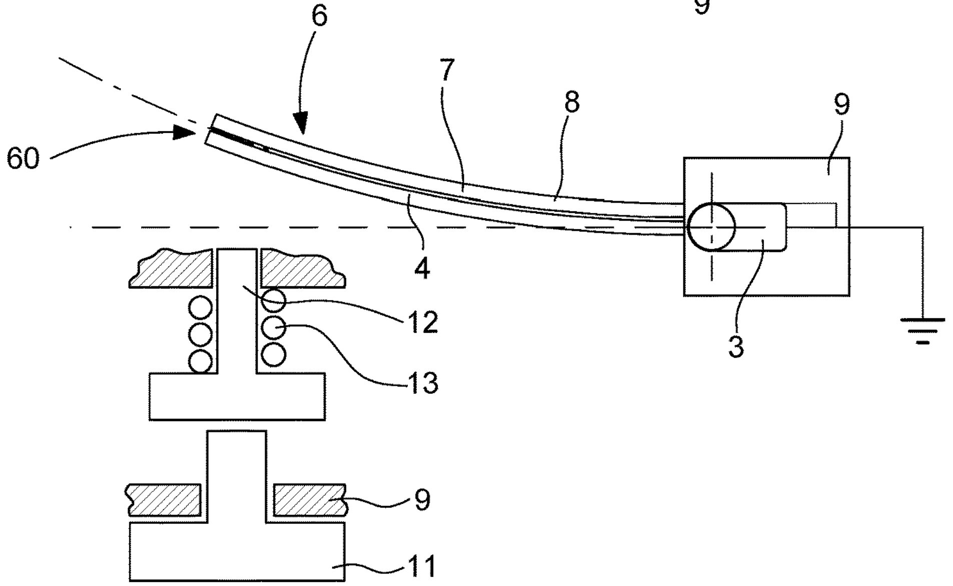
FIG. 6 represents, partially, a further alternative embodiment where the user has a control means to trigger the movement of a striker to strike the flexible body, and create a similar effect.
Figure 7:
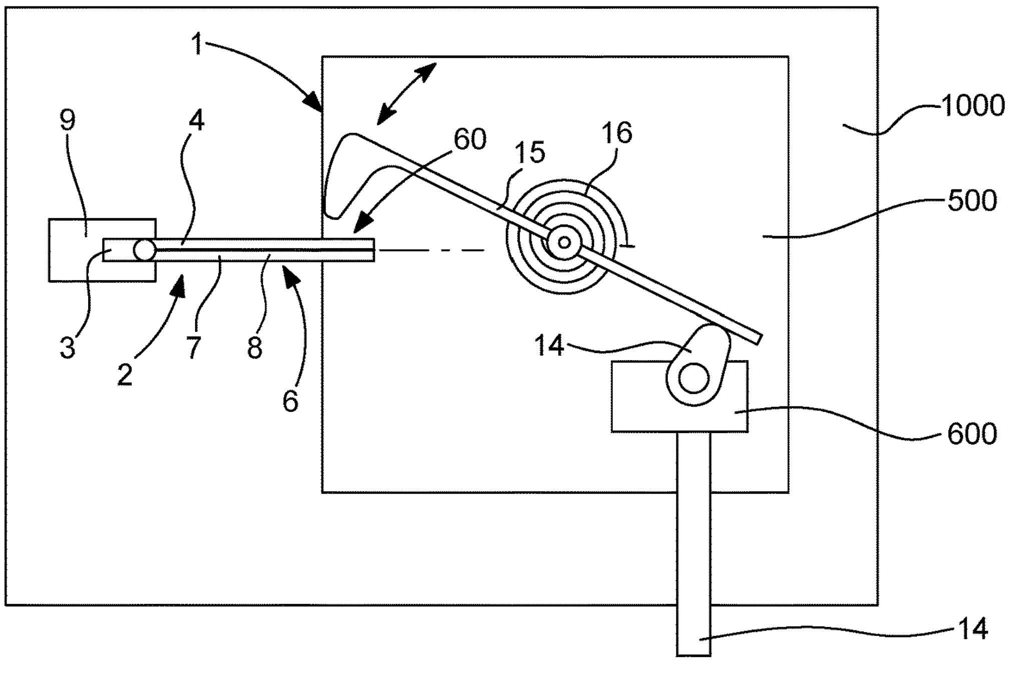
FIG. 7 represents, schematically, a timepiece, particularly a watch, including a movement and a striking mechanism for actuating a cam, for example in an alarm mechanism, or on the hourly change, or other, to strike the flexible body, and create a similar effect.

A typical signal of a flexible body 6 which is free to oscillate after a mechanical deformation is shown in FIG. 3, which is taken from the document "Measurement techniques for piezoelectric nanogenerators, Joe Briscoe, Nimra Jalali, Peter Woolliams, Mark Stewart, Paul M. Weaver, Markys Cainb and Steve Dunn. DOI: 10.1039/c3ee41889h". It is observed that in a few fractions of a second, the voltage at the poles of the flexible body 6 changes sign several times. In the device according to the invention, the flexible piezoelectric film 7 is directly connected to the poles of an LED bearing the reference 3, which is connected electrically like a diode. During the oscillation, when the LED 3 is polarised directly and the voltage exceeds the threshold value (2.8 V for a blue LED, for example), the LED 3 can emit light. The light is coupled inside the optical fibre 4, and comes out at the free end thereof. The rapid oscillation of the optical fibre 4, combined with the simultaneous light emission and the viewer's retinal persistence, makes it possible to create the effect of a shooting star, as illustrated in FIG. 4.

This effect is easily achievable using a commercial piezoelectric device combined with a commercial blue LED chip. The same result could be obtained with a white chip, as it has overall the same electrical characteristics as the blue one.

A further example of the use of the deformation of a piezoelectric film is shown in a video produced by the Korean university KAIST, wherein a piezoelectric nanogenerator is used to light a row of over one hundred blue LEDs, as can be read in the article "Highly-Efficient, Flexible Piezoelectric PZT Thin Film Nanogenerator on Plastic Substrates" Adv. Mater., 26, 2514, 2014, or viewable online at the line "http://www.you_tube.com/watch?v=G_Fny7Xb9ig".

As an alternative to assembling a piezoelectric film with an optical fibre, it is possible to cover an optical fibre on the surface with a deposition of piezoelectric material. This facilitates the assembly of the device, and at the same time reduces the mechanical rigidity of the flexible element, for increased efficiency.

The flexible body 6 can be placed behind a semi-transparent dial so that only the luminous effect can be seen by the user.

In the non-limiting alternative embodiment illustrated by FIGS. 1 and 4, the system is engaged by the movement of the cam which constitutes the mobile component 1. It is thus possible to consider generating the shooting star effect on demand, periodically or at random.

In the other alternative of the invention, the flexible body 7 does not necessarily include a piezoelectric layer, even if this flexible body 7 can also include a piezoelectric layer as in the first alternative. And the energy supply means 2 include, or consist of, a microgenerator, which is activated by a push-piece, a crown, a rotating bezel, or a specific barrel, or via the main barrel of the mechanical watch, which supplies the electrical energy to the light emission source 3, particularly at least one LED, and simultaneously activates the movement of the flexible body 6, via for example a mechanical striker 15 or similar.

The invention claimed is:

1. An intermittent display mechanism for a timepiece, comprising:

at least one mobile component in motion during an operation of said timepiece;

energy supply means that supplies at least one light emission source included in said mechanism and which is coupled with at least one light guide; and light emission control means, wherein said light emission control means includes at least one flexible body, said flexible body bearing said at least one light guide or consisting of said at least one light guide, and being attached to a fixed structure included in said mechanism and including at least one distal zone overhanging with respect to said structure and which is arranged to interfere mechanically, at periodic or random times, with said mobile component during a travel of said mobile component and move away from a rest position thereof before starting a vibration of said flexible body, and said energy supply means includes one of:

a microgenerator activated by a mobile control organ or by a barrel of the timepiece and arranged to simultaneously activate a movement of said flexible body via an impulse or percussion means of said mobile component, and a flexible piezoelectric film or coating borne by said flexible body and which is coated in an electrically insulating shell and which is arranged to convert mechanical energy supplied by said mobile component into electrical energy and to supply the electrical energy to said at least one light emission source.

2. The mechanism according to claim 1, wherein said at least one light guide is an optical fiber.

3. The mechanism according to claim 2, wherein said optical fiber is coated with said flexible piezoelectric coating in an electrically insulating shell.

4. The mechanism according to claim 2, wherein said optical fiber is arranged to transmit point-shaped light at a distal end thereof.

5. The mechanism according to claim 2, wherein said optical fiber is arranged to diffuse light along all or part of a length thereof.

6. The mechanism according to claim 5, wherein said optical fiber is covered with fluorescent material so as to emit light of different colors, coupled with at least one ultraviolet light emission source.

7. The mechanism according to claim 1, wherein said mechanism includes a semi-transparent or translucent screen to conceal the flexible body from a user, and allowing passage of light emitted by said light emission source and transported by said at least one light guide.

8. The mechanism according to claim 1, wherein said at least one light guide is an LED.

9. The mechanism according to claim 1, wherein said mechanism includes control means accessible to a user or controlled by said timepiece to set in motion at least one striker from a rest position to strike said at least one flexible body, and elastic return means to control a return of said striker from a percussion position to said rest position thereof.

10. The timepiece including said at least one mobile component in motion during the operation of said timepiece, and at least one said intermittent display mechanism according to claim 1.

11. The timepiece according to claim 10, wherein said timepiece includes at least one main striker configured to move from a rest position to strike said at least one flexible body, and main elastic return means to control a return of said main striker from a percussion position to said rest position thereof.

12. The timepiece according to claim 11, wherein said timepiece includes main control means accessible to a user or controlled by said timepiece to set in motion said at least one main striker.

13. The timepiece according to claim 12, wherein said timepiece includes a horological movement or a striking or alarm mechanism to control a movement of said at least one main striker.

* * * * *